(12) United States Patent
Akkad

(10) Patent No.: US 6,993,928 B2
(45) Date of Patent: Feb. 7, 2006

(54) DEVICE FOR CONDITIONING WATER PRODUCED BY AIR CONDITIONING OR ENVIRONMENTAL DEHUMIDIFICATION APPARATUSES OR PLANTS

(76) Inventor: Osman Akkad, White Crown Building, Sheik Zaied Road, Dubai (AE)

( * ) Notice: Subject to any disclaimer, the term of this patent is extended or adjusted under 35 U.S.C. 154(b) by 14 days.

(21) Appl. No.: 10/498,057

(22) PCT Filed: Dec. 12, 2002

(86) PCT No.: PCT/IT02/00785

§ 371 (c)(1),
(2), (4) Date: Jun. 9, 2004

(87) PCT Pub. No.: WO03/052209

PCT Pub. Date: Jun. 26, 2003

(65) Prior Publication Data

US 2005/0126199 A1    Jun. 16, 2005

(30) Foreign Application Priority Data

Dec. 14, 2001 (IT) .......................... RM2001A0737

(51) Int. Cl.
*F25D 21/14* (2006.01)
(52) U.S. Cl. ..................... 62/291; 62/389; 210/143
(58) Field of Classification Search ............... 62/93, 62/126, 271, 272, 285, 291, 389; 210/143
See application file for complete search history.

(56) References Cited

U.S. PATENT DOCUMENTS

| | | | | |
|---|---|---|---|---|
| 5,106,512 A | * | 4/1992 | Reidy | 210/744 |
| 5,149,446 A | * | 9/1992 | Reidy | 210/744 |
| 5,301,516 A | * | 4/1994 | Poindexter | 62/126 |
| 5,398,517 A | * | 3/1995 | Poindexter | 62/125 |
| 5,464,531 A |   | 11/1995 | Greene | |
| 5,514,344 A |   | 5/1996 | D Agaro | |
| 5,517,829 A | * | 5/1996 | Michael | 62/272 |
| 5,553,459 A | * | 9/1996 | Harrison | 62/93 |
| 5,845,504 A | * | 12/1998 | LeBleu | 62/92 |
| 5,857,344 A | * | 1/1999 | Rosenthal | 62/93 |
| 6,041,613 A | * | 3/2000 | Morse et al. | 62/305 |
| 6,251,172 B1 |   | 6/2001 | Conrad | |
| 6,343,479 B1 | * | 2/2002 | Merritt | 62/285 |
| 6,635,149 B1 | * | 10/2003 | Campbell et al. | 202/160 |
| 6,644,060 B1 | * | 11/2003 | Dagan | 62/285 |
| 6,684,648 B2 | * | 2/2004 | Faqih | 62/93 |

FOREIGN PATENT DOCUMENTS

| | | | |
|---|---|---|---|
| EP | 1 142 835 | | 10/2001 |
| JP | 60-75388 A | * | 4/1985 |
| WO | WO 00 14464 | | 3/2000 |
| WO | WO 01 63059 | | 8/2001 |

* cited by examiner

Primary Examiner—Mohammad M. Ali
(74) Attorney, Agent, or Firm—Young & Thompson

(57) ABSTRACT

Device for conditioning water produced by environmental conditioning or dehumidification apparatuses or plants, comprising a device (2) for measuring the quantity of water produced by a condenser (1) which transforms atmospheric humidity into water, a feeder (4) of a corrective composition of salts and mineral substances, preferably in the form of tablets (P), for dispensing at least one of them in proportion to the quantity of water measured, a mixing vessel (5) receiving the measured water and at least a tablet (P) provided by the feeder (4), a control and command unit (6) that activates the feeder (4) in proportion to the quantity of water measured and received, and a tank (7) for collecting and filtering the water provided with means (70) for filtering micro-organisms and bacteria and a valve (81) for the exit of potable water.

11 Claims, 4 Drawing Sheets

DEVICE FOR CONDITIONING WATER PRODUCED BY AIR CONDITIONING OR ENVIRONMENTAL DEHUMIDIFICATION APPARATUSES OR PLANTS

TECHNICAL FIELD

The present invention relates to a device, with nearly constant and automatic operation, for conditioning water produced by air conditioning or de-humidifying apparatuses or plants.

In many areas of the world, the problem of obtaining potable water is an extremely difficult one to solve.

In addition to systems and processes for distilling and conditioning sea water and for treating and recirculating waste water, the focus has also been on the possibility of recovering, conditioning and reusing water produced by conditioning plants or environmental dehumidification plants.

BACKGROUND ART

This problem has already been confronted by the prior art through the capture of the particles of water that constitute air humidity.

For example, the U.S. Pat. Nos. 3,035,418; 4,255,937; 5,259,203; 5,517,829; 5,53,459; 6,029,461; 6,182,453 disclose dehumidifier apparatuses, which separate water from air and store it also for human consumption. Said dehumidifier apparatus are designed to have maximum efficiency in their water production. The cycle for treating the water produced by said apparatuses also comprises a step of sterilising said water by means a source of ultraviolet light, showed in WO 00 14464. This sterilisation system has not been found to be always effective to obtain potable water.

Also known, for instance from U.S. Pat. No. 6,303,039, to treat the stagnant water produced by dehumidifiers and by conditioners to make innocuous to the environment by dissolving bactericidal substances therein. In order to be destined to nutrition and home uses, water must satisfy not only the requirement of bacteriological purity, but also chemical, physical and organoleptic requirements to be qualified as potable. Conditioning water to make it potable therefore needs two types of intervention: purification and correction. Waters such as those obtained from condensation and air dehumidification processes, are normally free of pathogenic microbes, for instance those deriving from pollution of faecal origin, as is instead the case for surface water or for water extracted from the subsoil, but, on the other hand, they are quite lacking in the mineral inorganic substances that are necessary for a proper chemical-organoleptic balance.

A problem not yet confronted adequately, therefore, is that of providing a treatment for correcting such water to restore acceptable average values of their content of mineral substances, in order to obtain potability and organoleptic acceptance conditions.

The aim of the present invention is to assure a purification and correction in substantially automatic and continuous fashion of water produced by dehumidifier apparatus, built prevalently, as mentioned above, to achieve high water productivity, and by air conditioning apparatuses designed mainly to create well-being situations in inhabited environments, to make it fit for human consumption.

DISCLOSURE OF INVENTION

The main aim of the invention, therefore, is to provide a treatment for correcting said water immediately after its condensation, thus making them almost immediately available for consumption, avoiding their stagnant storage in containers or open tanks with the risk that they may be polluted.

The invention, as it is characterised in the claims that follows, solves the problem of providing a device for conditioning water produced by conditioning or environmental dehumidification apparatuses, including a condenser for transforming atmospheric humidity into water, which, from a general point of view, is characterised in that it comprises:

a device for measuring the quantity of water produced by said condenser and destined to be poured into a conveyor;
a feeder for dispensing a predetermined quantity of a corrective composition of salts and minerals in proportion to a reached predefined quantity of water measured by the measuring device;
a mixing vessel receiving the water measured by the measuring device and arriving through said conveyor and said quantity of a corrective composition of salts and mineral substances provided by the feeder;
a tank for collecting and filtering the water treated with said corrective composition of salts and minerals dissolved therein, provided with filtering means, for treating bacteria and micro-organisms, communicating with and upstream of a valve for the exit of potable water;
a control and command unit operating, when the condenser is in operating condition, the feeder for dispensing said quantity of a corrective composition in proportion to the quantity of water measured by the measuring device; said unit also performing control and alarm functions at least on the operation of the feeder and on the filling level of the collection and filtering tank.

DESCRIPTION OF THE DRAWINGS

Further features and advantages of the present invention shall become more readily apparent from the detailed description that follows of a preferred embodiment, illustrated purely by way of non limiting example in the accompanying drawings, in which.

DESCRIPTION OF THE ILLUSTRATIVE EMBODIMENT

Figure 1:
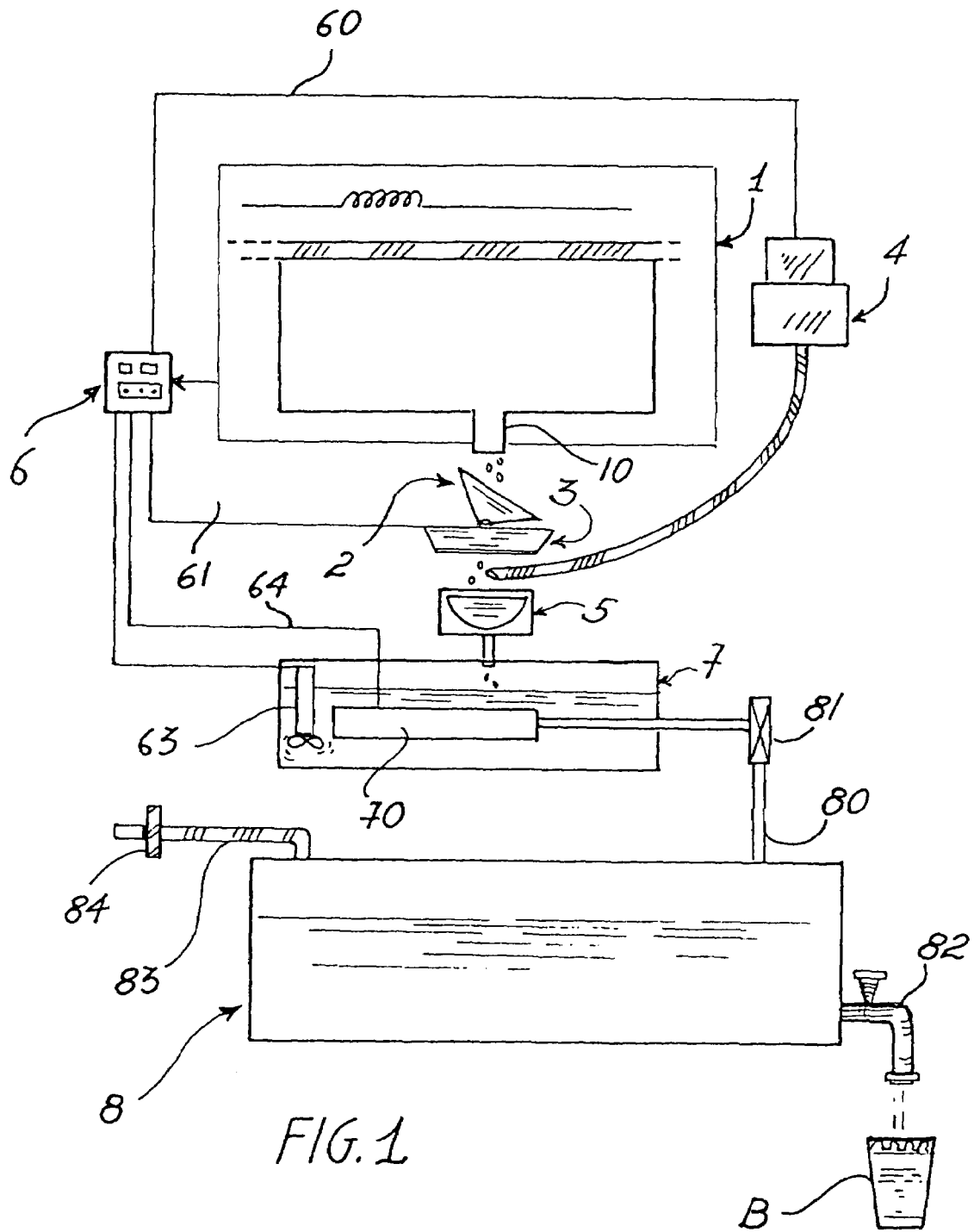
FIG. 1 shows a schematic view, substantially in blocks, of a plant for producing potable water from atmospheric humidity and for its distribution, which incorporates a conditioning device according to the present invention.

With reference to FIG. 1, which shows a schematic view, substantially in blocks, of a plant for producing potable water, according to the invention, the reference number 1 indicates a condenser for transforming atmospheric humidity into water, the number 2 a device for measuring the quantity of water produced by the condenser 1 and destined to be poured into a conveyor 3, the number 4 a feeder of predetermined quantities of a corrective composition of salts and minerals in pre-set proportion to the quantity of water measured by the measuring device 2, the number 5 a vessel for mixing the water arriving through the conveyor 3 with said corrective composition provided by the feeder 4, the number 6 a control and command unit that operates the feeder 4 in relation to the quantity of water measured and received through the conveyor 3, the number 7 a tank for collecting and filtering the water thus treated and the number 8 a refrigerated container for storing and distributing the potable water communicating with the collection and filtering tank 7.

In the condenser 1 is schematically shown a part of any environmental dehumidification or conditioning apparatus which, as is well known, produces water by condensation from atmospheric humidity. It should be specified that, for the purposes of the invention, the condenser 1, and hence the whole potable water production plant, is destined to function in an environment that is not polluted by dangerous chemical agents, in particular noxious gases or fumes, which may lead to dissolving dangerous chemicals to be dissolved in the water, requiring more complex treatments for their Elimination.

The collection and filtering tank 7, according to the invention, can be constituted by the common tank for collecting the condensation water of a known home conditioner or dehumidifier apparatus, modified or replaced as described hereafter.

The refrigerated container 8 for storing and distributing potable water communicating with the collection and filtering tank 7, through a pipeline 80 with valve, and possible circulation pump 81, can be a traditional office water container, provided with tap 82. To allow to fill a glass B with water, the interior of the container 8 is obviously in communication with the atmosphere through a pipe 83 fitted with a common air filter 84.

To make potable the water dispensed by the tap 82 and produced upstream by the condenser 1, the conditioning device of the invention is provided. The condensation water to be conditioned is received by the device 2 for the measuring the water produced by the condenser 1, measuring device which, in a preferred embodiment, is better illustrated in FIGS. 2 and 3, which are respectively a global perspective view of the conditioning device and an exploded perspective view of the measuring device alone.

Said corrective composition of salts and minerals, to be dosed in pre-set proportion to the quantity of water measured by the measuring device 2, comprises a complex of salts, acids and other inorganic substances which, once they are dissolved in water, are able to provide the water with the right mineral composition within the limits and proportions established by the literature and by current standards to qualify water as potable. Said composition must, for instance, contain salts, carbonates, bicarbonates, acids able to confer calcium, sodium, magnesium, potassium, fluorine, iron etc., in organoleptically acceptable average proportions.

This corrective composition can be dispensed in liquid form or in soluble solid form, either in grains or tablets. It has been experimentally determined, both for reasons of stability and conservation of the corrective composition and for reasons of ease of supply and use, that the solid tablet form is preferable. The remainder of the description will therefore refer to the dispensation of said corrective composition in the preferred form of tablets with pre-determined composition and dosage.

As shown in FIG. 1, the measuring device underlies a known nozzle 10 for the exit of the water from the condenser 1.

Note that the water provided by the condenser 1 is often dispensed, in particular in small apparatuses or plants for home use, in intermittent drops or in small, non continuous threads. Said dispensing, moreover, quantitatively depends on the conditions of environmental humidity, which are apt to vary periodically, daily and seasonally. Therefore, said measuring device according to the invention, must be such as to be able to intercept the condensation water in its discontinuity of dispensation and to measure it taking into account its quantitative variation over time.

Figure 2:
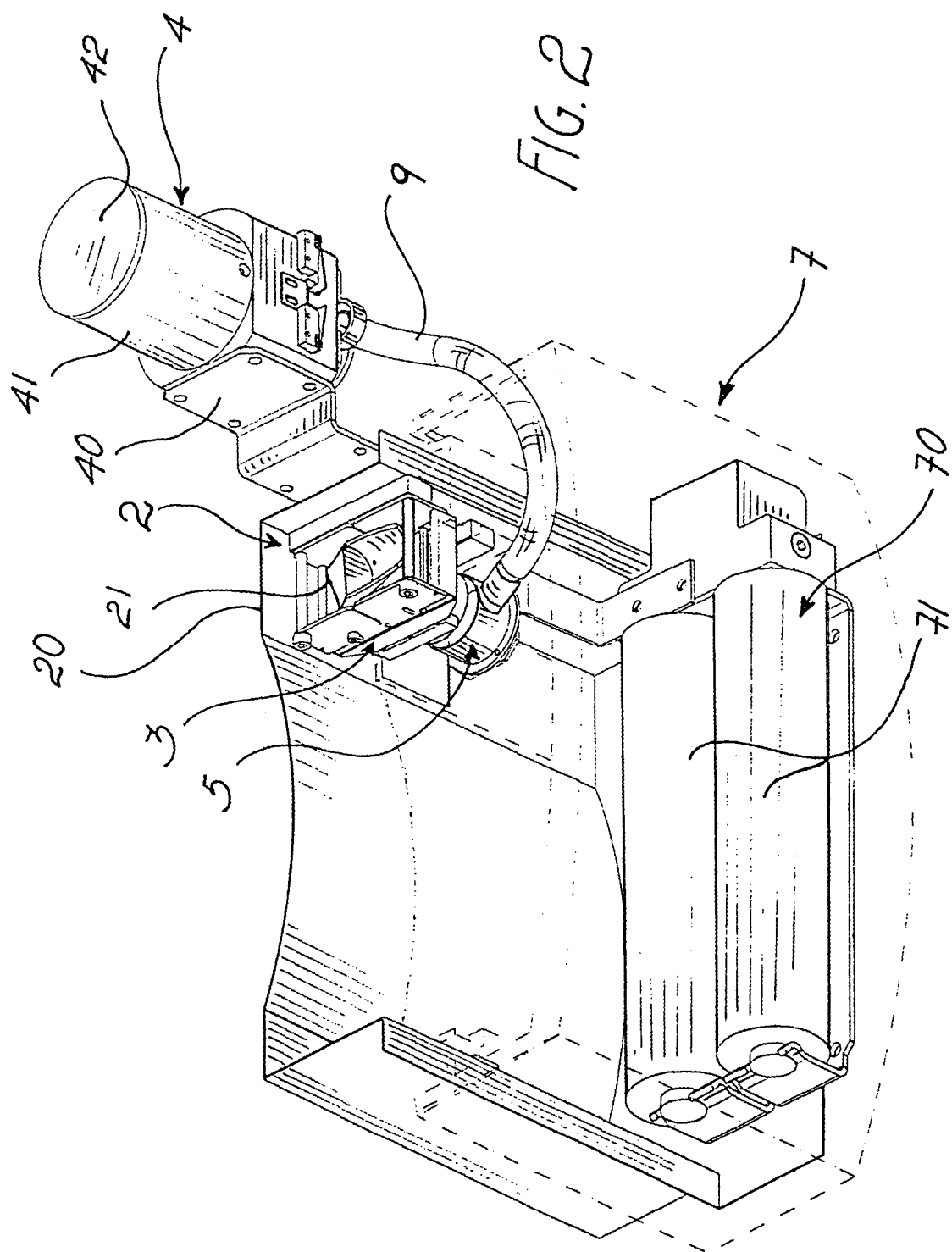
FIG. 2 shows a global perspective view of the conditioning device of FIG. 1.
Figure 3:
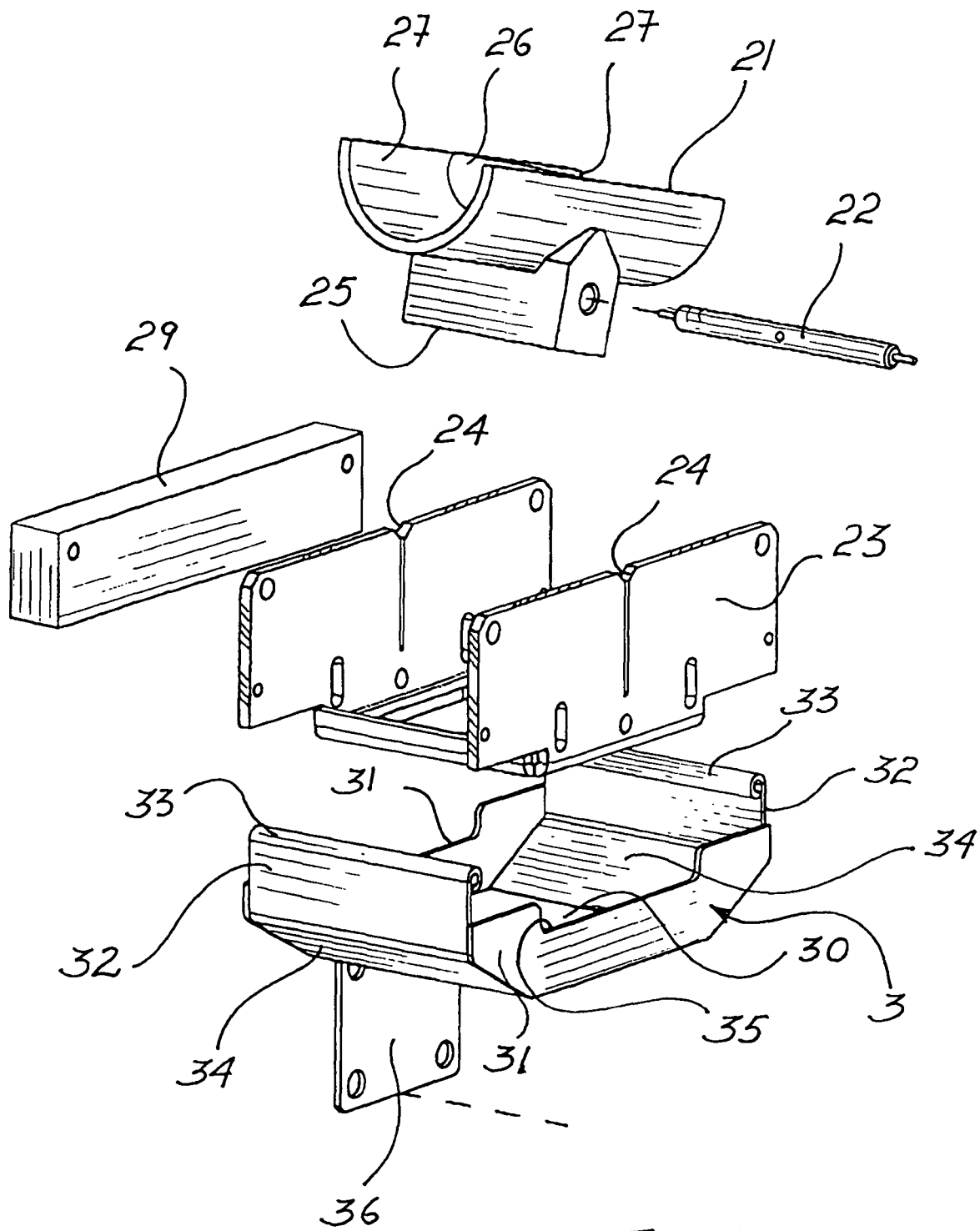
FIG. 3 shows an exploded perspective view of a device for measuring the water produced and related conveyor of the conditioning device of FIG. 1.

As shown in FIG. 2, advantageously, according to the invention, the measuring device 2 is fastened to a shaped vertical wall 20 integral with the associated collection and filtering tank 7.

The device 2 for measuring the water produced by the condenser 1, according to a preferred embodiment, superiorly has a swivelling semi-tubular element 21 for collecting the water. As shown in greater detail in FIG. 3, the swivelling semi-tubular element 21 is open at its opposite ends and is pivotally mounted, through a pivot spindle 22, onto a frame 23 provided with appropriate slots 24, 24 for housing the ends of the pivot spindle 22. The pivot spindle 22 is keyed in a prismatic block 25, appropriately shaped superiorly in order rigidly to receive the swivelling semi-tubular element 21 in such a way as to oscillate freely in a single piece therewith.

The swivelling semi-tubular element 21, overlying the conveyor 3 of the produced water, is separated internally in the transverse direction by means of a baffle plate 26 into two opposite chambers 27, 27. The reference number 29 indicates, by way of example, a block for fastening the measuring device 2 to the vertical wall 20.

The measuring device 2 overlies the conveyor 3, suspended underneath it. The conveyor 3 is tray shaped, having a bottom 30, lateral flanks 31, 31 and front and rear walls 32, 32 provided with end flaps 33, 33. The bottom 30, anteriorly and posteriorly inclined downwards by means of its walls 34, 34, is centrally provided with a hole 35 for the passage of the water arriving from the swivelling semi-tubular element 21, as shall be explained hereafter. The conveyor 3 is fastened to the shaped wall 20, for instance by means of a bracket 36.

The water produced by the condenser 1 descends in drops through the nozzle 10 into one of the two chambers 27, 27 of the swivelling semi-cylindrical element 21 of the measuring device 2. When said chamber 27 is sufficiently full, in the volume of water defining the predetermined limit weight causing the oscillation of the swivelling semi-cylindrical element 21, it tilts the element 21 to one side and causes the water contained therein, by gravity, into the underlying conveyor 3, positioning the other one of the two chambers 27, 27 in stable fashion underneath the nozzle 10. Each oscillation of the swivelling element 21 therefore measures a determined and certain quantity of water produced by the condenser.

As shown in FIG. 2, underlying the conveyor 3 is positioned the vessel 5 for mixing the measured water arriving through the conveyor 3 and at least a tablet provided by the feeder 4 through an advancement tube 9. The tablet 5 (FIGS.

4 and 5) is made to arrive by gravity from the feeder 4 which is fastened, for instance, to the shaped vertical wall 20 by means of a bracket 40.

Figures 4, 5:
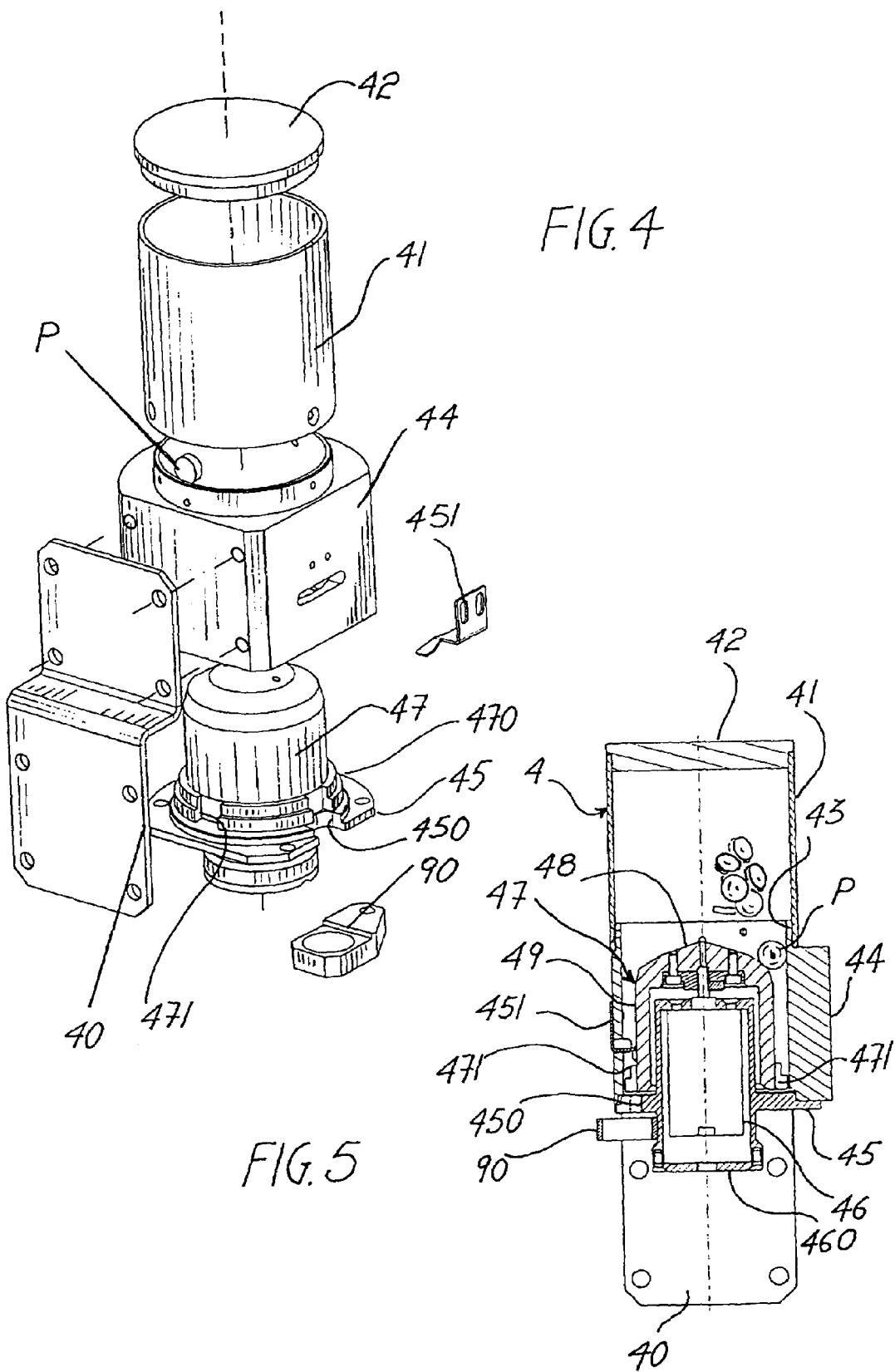
FIG. 4 shows a partially exploded perspective view of a feeder of correcting tablets of the conditioning device of FIG. 1.
FIG. 5 shows a diameter section of the feeder of correcting tablets of FIG. 4.

With reference now to FIGS. 4 and 5, which are respectively a partially exploded perspective view and a diameter section of the feeder 4, according to a preferred embodiment for dispensing the corrective composition in the form of tablets, of the conditioning device according to the invention. The feeder 4 of tablets P, in its preferred embodiment, comprises a container for tablets formed by an upper cylindrical wall 41, provided with a lid 42, by a lower cylindrical part 43 integrated in a body 44 and by a base 45. On the base 45 is pivotally mounted, by means of an electric motor 46 housed in a respective seat 460 passing through the base 45, a shaped dome 47. The shaped dome 47 has a convex upper surface 48 and substantially cylindrical outer lateral wall 49. The dome 47, suitably connected to the shaft of the motor 46 to rotate coaxially therewith, has such dimensions that between the outer lateral surface 49 and the inner surface of the lower cylindrical part 43 of the tablet container there is such a gap as to allow only the vertical positioning of the tablets P. The dome 47 has at its base stepped projections 470 (FIG. 4), each having greater diametrical width than a tablet, separated by a plurality of circumferentially equidistant seats 471, each seat 471 having such dimensions as to receive a single tablet. The number of seats 471 can be four. On the base 45 of the feeder is appropriately provided a through opening 450 surmounted by an interdiction cap 451 fastened from the outside to the body 44 of the tablet container. The tablet container 451 prevents tablets coming from the top of the container to enter the through opening. If one of the seats 471 is initially positioned correspondingly surmounting the through opening 450, at each 90° rotation a successive seat 471 is positioned in correspondence with the through opening 450. The through opening 450 is in communication through the advancement tube 9, supported by means of an attachment neck 90, with said mixing vessel 5 of the water measured by the measuring device 2 with the tablet P.

The mixing vessel 5 has a centrally concave bottom, inferiorly holed with a hole of smaller size than the diameter of the tablet P, so that it cannot pass through it before having been gradually dissolved by the water poured thereon by the measuring device 2. The operation, already fairly apparent in itself, shall be described in detail hereafter.

The control and command unit 6 (FIG. 1) operates through an electrical connection line 60 the tablet feeder 4 in proportion and upon reaching the predetermined quantity of water measured and received through the conveyor 3, through an electrical connecting line 61 which allows to count the oscillation of the swivelling element 21 on the pivoting spindle 22 of the measuring device 2.

For example, once the number of oscillations of the swivelling element 21 corresponding to the pouring of two litres of condensation water into the collection and filtering tank 7 is counted, the fall is allowed of one tablet, of corrective composition, dosed and proportioned to the two litres of water, which is gradually dissolved by the additional water dispensed in the conveyor 3.

The command unit 6, in addition to checking, providing alarm signals, for the presence of tablets in the container of the feeder 4 and any jamming thereof, may provide, through a line 62, for the operation a possible device 63 for agitating the conditioned water inside the collection and filtering tank 7. Said agitator device 63 serves the function of mixing and homogenising the water contained in the tank corrected with the periodic dissolution of the tablet P. The command unit 6 can also provide for the continuous measuring of the water level in the collection and filtering tank 7, schematically illustrated through a connecting line 64.

Moreover, according to the invention, the collection and filtering tank 7 is internally provided with means 70 for filtering the water as treated above, schematically illustrated with two immersed cylindrical bodies 71, in communication with and upstream of the valve 81 for the exit of potable water. Said filters, known in themselves, are sterilisation filters, for instance preferably with granular filling of ceramic material or kieselgur, with such porosity as to withhold the any micro-organisms and bacteria present in the water and, obviously, any other suspensions or corpuscles present in the water, which may derive from the condenser 1.

Advantageously, when necessary, for a greater certainty of reaching the prescribed condition of bacteriological purity of the condensation water, said corrective composition, also in its solid tablet form, can be formulated to comprise also common bactericide substances.

The operation of the conditioning device according to the invention therefore is as follows. Once the count number corresponding to a determined flow rate of water is reached, the command unit 6 activates the feeder 4 of corrective composition, possibly in the form of tablets P, causing the dome 47 to rotate. In this way a tablet positioned in a seat 471 is brought in correspondence with the through opening 450 obtained at the base 45 of the tablet container. The tablet P is made to advance by gravity through the advancement tube 9 to reach the mixing vessel 5 where it is dissolved by the water coming from the conveyor 3. The solution of condensation water enriched by the minerals dissolved from the tablet falls into the collection and filtering tank 7 wherefrom it exits, passing the filtering means 70, to feed a preferably refrigerated storage and distribution container 8.

In this way, a nearly continuous automatic conditioning is assured during the operation of the condenser 1, with perfect treatment in terms of bacteriological purification and correction of the chemical content and of the organoleptic characteristics, of the water obtained by condensation by an environmental dehumidification or conditioning apparatus.

Naturally, the invention as conceived can be subject to numerous modifications and variations, without thereby departing from the scope of the same inventive concept that characterises it as claimed below.

What is claimed is:

1. Device for conditioning water produced by environmental conditioning or dehumidification apparatuses or plants that include a condenser (1) for transforming atmospheric humidity into water, a tank (7) collecting the water, filtering means (7), a valve (81) for exit of potable water, a control and command unit (6), characterised in that it also comprises:

a device (2) for measuring a quantity of water produced by said condenser (1) and destined to be poured into a conveyor (3);

a feeder (4) for dispensing a dosed predetermined quantity of a corrective composition of salts and minerals in proportion to a reached predefined quantity of water measured by the measuring device (2);

a mixing vessel (5) receiving the water measured by the measuring device (2) coming through said conveyor (3) and said quantity of a corrective composition of salts and minerals supplied by the feeder (4); said tank (7) being placed downstream of the mixing vessel (5) to collect the water treated with said corrective composition dosed of salts and minerals dissolved therein, and being provide with said filtering means (70) for withholding bacteria and micro-organisms;
said control and command unit (6) activating, when the condenser (1) is in operation, the feeder (4) for dispensing said quantity of the dosed corrective composition in proportion to the quantity of water measured by the measuring device (2) to provide, once they are dissolved in water, a correct mineral composition of the water for its qualification as potable; said unit further performing monitoring and alarm functions at least over the operation of the feeder (4) and of the level of filling of the collection and filtering the tank (7).

2. Device as claimed in claim 1, characterised in that said corrective composition of salts and minerals further comprises bactericide substances.

3. Device as claimed in claim 1, characterised in that said corrective composition of salts and mineral substances is provided in liquid form.

4. Device as claimed in claim 1, characterised in that said corrective composition of salts and mineral substances is provided soluble solid form.

5. Device as claimed in claim 4, characterised in that said corrective composition of salts and mineral substances is provided in the form of tablets (P).

6. Device as claimed in claim 1, characterised in that said device (2) for measuring the water produced by the condenser (1) comprises a swivelling semi-tubular element (21) for collecting the water, pivotally mounted, through a pivot spindle (22), onto a frame (23) overlying said conveyor (3) of the produced water; said swivelling semi-tubular element (21) being separated transversely by means of a baffle plate (26) into two opposite chambers (27, 27) which, alternatively filled one at a time by the water produced by the condenser (1) through its nozzle (10), pour by gravity and alternating oscillations measured quantities of water into said conveyor (3).

7. Device as claimed in claim 4, characterised in that said feeder (4) of tablets(P) comprises a container for tablets, having at its base (45), a rotating dome (47) so shaped that between the outer lateral surface (49) of the rotating dome (47) and the inner surface (43) of the container there is such a gap as to allow the positioning of tablets (P) arranged vertically; said dome (47) having at its base stepped projections (470) separated by a plurality of seats (471) circumferentially equidistant for the reception of a single tablet (P), destined to come in correspondence of a single through opening (450) obtained in said base (45) and provided with an interdiction cap(451) to allow the passage of a single tablet (P) at a time at each rotation of the rotating dome (47) which places in correspondence a seat (471) with said through opening (450); the through opening (450) being in communication with an advancement tube (9) to said vessel (5) for mixing the water measured with the tablet (P).

8. Device as claimed in claim 1, characterised in that said collection and filtering tank (7) is provided with means (63) for agitating the water, commanded by said control and command unit (6).

9. Device as claimed in claim 1, characterised in that said means (70) for filtering the water are constituted by at least a submerged filter (71), in communication with and upstream of a valve 81 for exit of potable water.

10. Device as claimed in claim 9, characterised in that said filter (71) is constituted by a sterilisation filter with such porosity as to withhold any micro-organisms and bacteria which may be present in the water.

11. Device as claimed in claim 1, characterised in that said collecting and filtering tank (7) feeds through a valve (81) a container (8) for storing and distributing potable water, wherefrom water is drawn through a tap (82).

* * * * *